United States Patent [19]
Van Gerwen et al.

[11] 3,753,115
[45] Aug. 14, 1973

[54] ARRANGEMENT FOR FREQUENCY TRANSPOSITION OF ANALOG SIGNALS

[75] Inventors: Petrus Josephus Van Gerwen; Robert Johannes Sluyter, both of Emmasingel, Eindhoven, Netherlands

[73] Assignee: U. S. Philips Corporation, New York, N.Y.

[22] Filed: Jan. 4, 1972

[21] Appl. No.: 215,334

[30] Foreign Application Priority Data
Jan. 27, 1971 Netherlands ........................ 7101037

[52] U.S. Cl. .................... 325/323, 328/37, 328/167, 340/347 AD, 340/347 DA, 325/42
[51] Int. Cl. ............................................. H04b 1/10
[58] Field of Search ............................. 328/37, 167; 307/221 D; 325/323, 42; 340/347 AD, 347 DA

[56] References Cited
UNITED STATES PATENTS

| | | | |
|---|---|---|---|
| 3,521,170 | 7/1970 | Leuthold | 325/323 |
| 3,184,685 | 5/1965 | Funk et al. | 328/37 X |
| 3,297,951 | 1/1967 | Blasbalg | 328/37 |
| 3,500,215 | 3/1970 | Leuthold et al. | 307/221 D |
| 3,546,490 | 12/1970 | Sangster | 307/221 D |
| 3,639,848 | 2/1972 | Elliott | 328/167 |

*Primary Examiner*—John S. Heyman
*Attorney*—Frank R. Trifari

[57] ABSTRACT

In an arrangement for transposition of the frequency band of an analog signal the analog signal is first converted into a digital signal in an analog-to-digital converter. The digital output of the converter is connected to a multistage shift register operated with shift pulses having a pulse width less than half the pulse width of the highest frequency analog signal. A first weighting network is connected to each stage of the shift register and multiplies the information in the associated stage by a factor corresponding to a Fourier expansion of a desired transfer function resulting in a digital bandpass filter. The output of the weighting network is combined in a combination network and reconverted into analog form in a digital-to-analog converter. In order to correct for distortions due to the limited number of shift register stages at least one additional weighting network is connected to the shift register stages for providing a transfer function with the same bandwidth as the transfer function provided by the first weighting network, although the transfer function of the additional weighting network is shifted in phase with respect to that of the first weighting network. As with the first weighting network a digital-to-analog converter connected to a combining network for the additional weighting network provides analog signals. The analog signals associated with the first weighting network modulate the output signal of a carrier frequency generator, while the analog signals associated with the additional weighting network modulate a phase shifted version of the output of the carrier frequency generator. The phase shifted modulated carrier is then subtracted from the modulated carrier in an additional combining network thereby removing the objectionable portions of the modulated carrier produced by the distortions from the shift register and first first weighting network.

6 Claims, 4 Drawing Figures

ARRANGEMENT FOR FREQUENCY TRANSPOSITION OF ANALOG SIGNALS

The invention relates to an arrangement for frequency transposition of analog signals located in a given frequency band. The arrangement includes a cascade of a bandpass filter having a transfer characteristic for selecting said frequency band and a frequency transposition stage including a modulator fed by a carrier for frequency transposition of the selected analog signal. The bandpass filter includes a cascade of an analog-to-digital converter, a shift register and a digital-to-analog converter. The analog signal is converted in the analog-to-digital converter into a pulse series corresponding to the analog signal. The pulse series is applied to the shift register which includes a plurality of shift register elements whose contents are shifted by a shift pulse generator at a shift period which is shorter than half the period of the highest frequency in said frequency band. The shift register elements are connected through weighting networks to a combination network for combining the pulse series shifted in the shift register elements periodically over a time interval equal to the shift period. In particular bandpass filters having a large slope are used as is common practice in frequency transposition arrangements.

The above structure of a filter for analog signals has in general been described in U.S. Pat. No. 3,521,170, issued July 21, 1970 and this structure is in principle suitable for complete integration in one semiconductor body because only logical circuits and resistors are used, whereas reactive elements are not used. When using this structure in the arrangment for frequency tansposition of analog siganls described in the preamble in which a bandpass filter is employed as a filter, difficulties of a principal character are found to occur which make the complete integration in one semiconductor impracticable. Applicants found after extensive investigations that especially for bandpass filters of the type described a very large number of shift register elements, for example, 150 to 200 with the associated weighting networks is required to realize a transfer characteristic of acceptable quality. This quality rapidly decreases if the number of shift register elements is decreased for the purpose of complete integration in one semiconductor body. More particularly this decrease in the number of shift register elements is found to result in a strong asymmetric distortion in the transfer characteristic of the bandpass filter. This very disturbing distortion produces serious distortions in the frequency-transposed analog signal, which distortions are certainly inadmissible in an analog signal in the form of a carrier-modulated data signal.

An object of the present invention is to provide an arrangement of the kind described in the preamble suitable for complete integration in one semiconductor body in which in spite of a considerable decrease in the number of shift register elements with the associated weighting networks the influence of asymmetric distortion in the transfer characteristic of the bandpass filter is eliminated.

According to the invention the arrangement is characterized in that for correcting asymmetrical distortion in the transfer characteristic of the bandpass filter the arrangement includes a correction circuit which is provided with additional weighting networks connected to the shift registers elements and to a second combination network for obtaining a transfer characteristic which, apart from asymmetrical distortion, is a version of the first-mentioned transfer characteristic shifted over a fixed phase angle. The correction circuit is furthermore provided with a second modulator fed by said carrier through a phase-shifting network and being followed by a combination network combining the output signals from the two modulators and correcting, in cooperation with said phase-shifting network, the effect of the asymmetrical distortion in the first-mentioned transfer characteristic on the frequency-transposed analog signal.

In order that the invention may be readily carried into effect, some embodiments thereof will now be described in detail by way of example with reference to the accompanying diagrammatic drawings in which.

Figure 1:
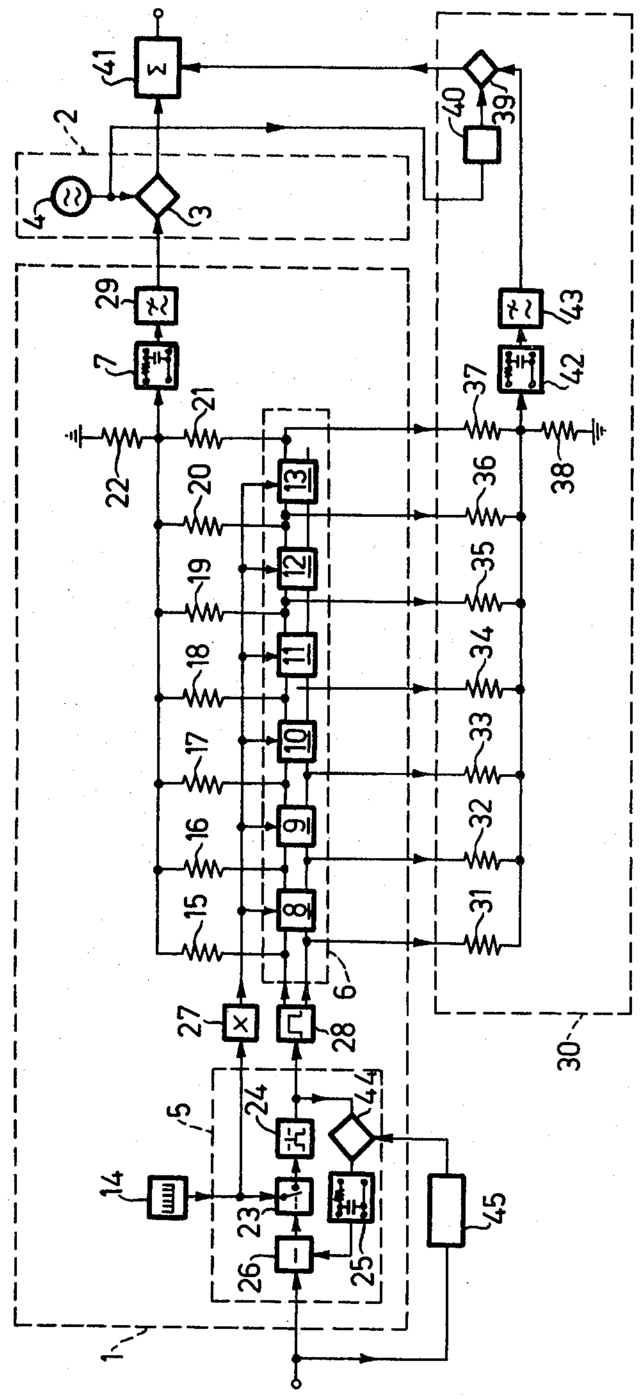
FIG. 1 shows a frequency transposition arrangement according to the invention.

The frequency transposition arrangement shown in FIG. 1 is incorporated in a receiver for analog signals which are constituted by data signals modulated on a carrier of, for example, 2.8 kHz by means of single sideband modulation and are located in the frequency band ranging from, for example, 0.4 kHz to 2.8 kHz. In the arrangement of FIG. 1 the incoming analog signal is applied to a cascade of a bandpass filter 1 having a transfer characteristic for selecting said frequency band ranging from 0.4 to 2.8 kHz and a frequency transposition stage 2 including a modulator 3 fed by a 2.8 kHz carrier. The demodulated data signal obtained by frequency transposition and located in the base band ranging from 0 to 2.4 kHz is derived from the output of frequency transposition stage 2 for further processing in the receiver. The 2.8 kHz carrier originates from a carrier generator 4 which is constituted, for example, as an oscillator accurately synchronized on the carrier frequency of the received analog signal, for example, by a co-transmitted pilot signal or by other known methods.

Figure 2:
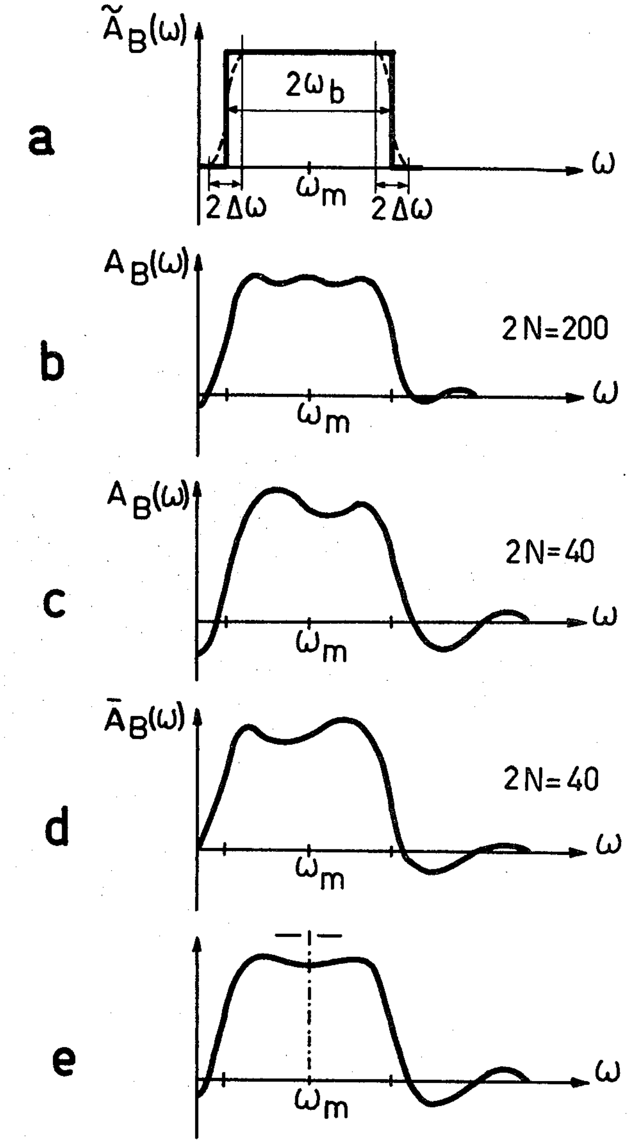
FIG. 2 and FIG. 3 show a few frequency diagrams to explain the operation of the arrangement according to FIG. 1.

To obtain a frequency transposition having an optimum selection i.e. a distortion-free transmission of the analog signals located within the passband ranging from 0.4 to 2.8 kHz and full suppression of all signals located beyond this band, a transfer characteristic of bandpass filter 1 having an amplitude characteristic $\tilde{A}_B(\omega)$ of the shape shown at *a* in FIG. 2 is aimed at. In addition there is the requirement, which is particularly important for carrier-modulated data signals, that the phase characteristic $\tilde{\phi}(\omega)$ within this passband must vary linearly.

If this ideal bandpass filter 1 has a center frequency $\omega_m$ (rad/sec) and a bandwidth $2\omega_b$ (rad/sec) the amplitude characteristic may then be mathematically written as:

$$\tilde{A}_B(\omega) = \begin{cases} 1, & \omega_m - \omega_b \leq \omega \leq \omega_m + \omega_b \\ 0, & \text{elsewhere} \end{cases} \quad (1)$$

where in the present example (compare *a* in FIG. 2): $\omega_m = 2\,\pi.\ 1600$ rad/sec; $2\omega_b = 2\,\pi.\ 2400$ rad/sec. For the phase characteristic it is possible to write:

$$\tilde{\phi}(\omega) = -\omega t_o + \phi_o.$$

where to is the constant delay of the bandpass filter and $\phi_o$ is a constant phase angle.

In practice such a rectangular amplitude characteristic cannot be realized because the flanks have a finite width $\Delta\omega$ as is shown by broken lines in FIG. 2 at *a*, the slope of the flank being characterized by $k = \omega_b/\Delta\omega$. For the arrangement of FIG. 1 the slope *k* of the edges is, for example, 5.

In the arrangment shown in FIG. 1 the general filter construction as described in U.S. Pat. No. 3,521,170 is used for the construction of bandpass filter 1. Accordingly, bandpass filter 1 is provided with a cascade of an analog-to-digital converter 5, a shift register 6 and a digital-to-analog converter 7, the incoming analog signal being converted in analog-to-digital converter 5 into a pulse series in which the pulses characterize the analog signal by their presence and absence. This pulse series is applied to shift register 6 which includes a plurality of shift register elements 8, 9, 10, 11, 12, 13 whose contents are shifted by a clock pulse generator 14 at a shift period $\tau$ which is shorter than half the period of the highest frequency in said frequency band ranging from 0.4 to 2.8 kHz, the shift register elements 8, 9, 10, 11, 12, 13 being connected through weighting networks 15, 16, 17, 18, 19, 20, 21 to a combination network 22 for combining the pulse series shifted every time over a time interval $\tau$ in the shift register elements. As regards its influence on the analog signal to be filtered, digital-to-analog converter 7 is constituted as the inverse of analog-to-digital converter 5, i.e. when directly applying the output pulse series from analog-to-digital converter 5 to digital-to-analog converter 7 an analog signal is produced at the output of this digital-to-analog converter which, apart from the quantization inaccuracy, corresponds to the analog signal applied to analog-to-digital converter 5.

It has already been described in the abovementioned U.S. patent that in a filter for analog signals having the above filter structure the filtering action is established in the arrangement constituted by shift register 6, weighting networks 15 – 21 and combination network 22 and that this filtering action is completely independent of the pulse code used for the analog-to-digital conversion. The description of the relevant bandpass filter 1 is therefore limited to only one pulse code and reference is made to the above-mentioned patent application for other pulse codes.

In the arrangement of FIG. 1 a delta modulator is used as analog-to-digital converter 5. The delta modulator is constituted by a pulse code modulator 23 connected to a pulse generator. The output pulses of pulse code modulator 23 are applied through a pulse regenerator 24 to a digital-to-analog converter 25 in the form of an integrating network. Like the incoming analog signal the output signal from integrating network 25 is applied to a difference producer 26 for producing a difference signal which controls pulse code modulator 23. The pulses for delta modulator 5 are derived in the relevant embodiment from the same pulse generator 14 which, optionally through a frequency multiplier 27, provides the shift pulses for shift register 6. The digital-analog converter 7 associated with delta modulator 5 has the form of an integrating network which corresponds to the integrating network 25 in deltamodulator 5.

In analog-to-digital converter 5 constituted by the delta modulator, pulse generator 14 applies pulses to pulse code modulator 23 whose pulse repetition frequency $\omega_p$ (rad/sec) is at least twice higher than the highest frequency in said frequency band of the analog signal; this pulse repetition frequency is, for example, 48 kHz. Dependent on whether the instantaneous value of the output signal from integrating network 25 is smaller or larger than the analog signal likewise applied to differnce producer 26, a difference signal of negative or positive polarity is produced at the output of difference producer 26. Dependent on this polarity of the difference signal the pulses originating from pulse generator 14 occur or do not occur at the output of pulse code modulator 23. These pulses are applied to integrating network 25 through a pulse regenerator 24 for the purpose of suppressing the variations in amplitude, duration or shape produced in pulse code modulator 23. The time constant of this integrating network is, for example, 0.25 msec.

The delta modulator 5 described above tends to render the difference signal zero so that the output signal from integrating network 25 constitutes a quantized approximation of the analog signal. In fact, for a difference signal of negative polarity pulse code modulator 23 applies a pulse to integrating network 25 so that the negative difference signal is counteracted, whereas conversely for a difference signal of positive polarity pulse code modulator 23 does not apply a pulse to integrating metwork 25 and thus counteracts the continuation of the positive difference signal. Thus delta modulator 5 forms a pulse series in which the pulses correspond to the incoming analog signal by their presence and absence.

The pulse series provided by delta modulator 5 is applied through a pulse widener 28 to shift register 6 whose elements 8 – 13 are connected through the weighting networks 15 – 21 to combination network 22. The signal derived from combination network 22 is subsequently to digital-to-analog converter 7. It has been extensively described in the above-mentioned patent application how the filtering of the analog signal is exclusively accomplished by the filtering action performed on the pulse series provided by delta modulator 5 by the arrangement constituted by shift register 6, weighting networks 15 – 21 and combination network 22. When the incoming analog signal has a frequency spectrum $S(\omega)$ and when the arrangement constituted by shift register 6, weighting networks 15 – 21 and combination network 22 has a transfer characteristic $H(\omega)$ for the pulse series applied thereto, an analog signal occurs at the output of digital-to-analog converter 7 which, apart from quantization noise, has a frequency spectrum of the shape:

$$H(\omega); S(\omega)$$

The desired transfer characteristic $H(\omega)$ is obtained by suitably proportioning the transfer coefficients $C_{-3}$, $C_{-2}$, $C_{-1}$, $C_0$, $C_1$, $C_2$, $C_3$ of the weighting networks 15, 16, 17, 18, 19, 20, 21 for a given shift period $\tau$.

The above-mentioned patent application proves mathematically that for 2N shift register elements and weighting networks which, starting from the ends of shift register 6, are pairwise equal with their transfer coefficients $C_p$ satisfying:

$$C_{-p} = C_p \text{ with } p = 1, 1, \ldots, N \tag{4}$$

a transfer characteristic $H(\omega) = A(\omega) . \exp j\phi(\omega)$ is obtained whose amplitude characteristic $A(\omega)$ has the shape:

$$A(\omega) = C_0 + \sum_{p=1}^{N} 2C_p \cos (p\omega\tau) \tag{5}$$

and whose phase characteristic $\phi(\omega)$ has an exact linear variation in accordance with:

$$\phi(\omega) = -N\,\omega\tau \tag{6}$$

The amplitude characteristic thus constitutes a Fourier series developed in $N$ cosine terms whose periodicity $\Omega$ is given by:

$$\Omega\tau = 2\,\pi \tag{7}$$

For obtaining the desired amplitude characteristic $\tilde{A}_B(\omega)$ according to formula (1) the coefficients $C_p$ in the Fourier series may be determined with the aid of the relation:

$$C_p = (1/\Omega) \int_0^{\Omega} \tilde{A}_B(\omega) \cdot \cos (p\omega\tau) d\omega \tag{8}$$

Negative coefficients $C_p$ in the Fourier series may be obtained by deriving the inverted pulse series from the shift register elements, which series are available in addition to the pulse series when these elements are formed as bistable triggers.

The periodical behaviour of the Fourier series results in the desired amplitude characteristic repeating at a periodicity $\Omega$ so that additional pass bands of bandpass filter 1 are produced. In practice these additional pass bands are, however, not disturbing because for a sufficiently large value of the periodically $\omega$, at a sufficiently small value of shift period $\tau$, the frequency interval between the desired and the next additional pass band therefore is sufficiently large to suppress the additional pass bands with a simple suppression filter 29 without the amplitude characteristic and the linear phase characteristic in the desired pass band being noticeably influenced. Suppression filter 29 is constituted, for example, by a lowpass filter comprising a resistor and a capacitor.

The demodulated data signal in the low frequency band ranging from 0 to 2.4 kHz which is processed in known manner in the receiver is derived with the aid of frequency transposition stage 2 from the analog signal in the frequency band ranging from 0.4 to 2.8 kHz selected with the aid of the above-mentioned bandpass filter 1.

In principle the arrangement described is suitable for complete integration in a semiconductor body, but in practice difficulties of a fundamental nature are found to occur. After extensive investigations Applicants found that, entirely in contrast with the lowpass filters described in the aforementioned U.S. Pat. No. 3,521,170 a bandpass filter having a transfer characteristic of acceptable quality can only be obtained in the arrangement described when using a very large number of shift register elements. Thus in the embodiment described 150 to 200 shift register elements are required for this purpose which corresponds to an approximation of the transfer characteristic by a Fourier series of 75 to 100 terms. This large number of shift register elements and the associated accurate weighting networks prevents practical integration in a semiconductor body. In fact, the limits admissible for a practical integration are determined on the one hand by the surface and the tolerances and on the other hand these limits are far exceeded by the required direct supply current which is, for example, 125 mA for 200 shift register elements. This fact results *inter alia* in the admissible dissipation of, for example, 250 mW being considerably exceeded while in the supply tracks occur considerable voltage losses which produce irregularities in the direct supply voltage for the different shift register elements. In addition, for a Fourier approximation employing 75 to 100 terms the mutual ratios of the transfer coefficients of the weighting network become so large that they can hardly be realized for a practical integration. The amplitude characteristic $A_B(\omega)$ of the bandpass filter described is illustrated at *b* in FIG. 2 for a number of shift register elements 2N = 200 with the minimum stop-band attenuation being 45 to 50 dB.

When this number of shift register elements 2N is reduced to 40 or 50, i.e. if the Fourier approximation of the transfer characteristic of bandpass filter 1 is truncated after 20 to 25 terms so as to make complete integration in a semiconductor possible, a disturbing phenomenon is found to occur which is characteristic of the Fourier approximation of a bandpass filter. In fact, when the number of Fourier terms is reduced by this amount a distortion of 20 percent which is asymmetrical relative to the center frequency $\omega_m$ and which causes very serious distortions in the frequency-transposed analog signal occurs both in the passband and in the flanks of the transfer characteristic of bandpass filter 1. Particularly for the described receiver for carrier-modulated data signals these distortions cannot be tolerated because they cause the dimensions of the eye opening of the eye pattern of the demodulated data signals to decrease strongly i.e. the distinction between the different amplitude values in the data signal is strongly reduced. Simultaneously with the reduction of the number of shift register elements the minimum stop-band attenuation also decreases to approximately 20 dB which value is, however, still sufficient for the selection by bandpass filter 1 in the described arrangement for frequency transposition of modulated data signals.

To illustrate the asymmetrical distortion in the transfer characteristic of the described bandpass filter in case of reduction of the numberof shift register elements, the amplitude characteristic $A_B(\omega)$ is shown in FIG. 2*C* for a number of shift register elements 2N = 4O.

The invention provides a very elegant solution to the above-mentioned problem of complete integration of the described frequency transposition arrangement in one semiconductor body in that for the correction of asymmetrical distortion in the transfer characteristic of the bandpass filter while maintaining the minimum stop-band attenuation the arrangement includes a correction circuit 30 which is provided with additional weighting networks 31 – 37 connected to the shift register elements 8 – 13. The weighting networks are connected to a second combination network 38 to obtain a transfer characteristic which, apart from asymmetrical distortion, is a version of the first-mentioned transfer characteristic shifted over a fixed phase angle. The correction circuit 30 is furthermore provided with a second modulator 39 fed by said carrier of 2.8 kHz through a phase-shifting network 40 and being followed by a combination network 41 combining the output signals from the two modulators 3, 39 and correcting, in cooperation with said phaseshifting network 40, the effect of asymmetrical distortion in the first-mentioned transfer characteristic on the frequency-transposed analog signal.

In the embodiment shown a transfer characteristic is realized with the aid of the weighting networks 31 – 37 in correction circuit 30. The transfer characteristic is shifted $\pi/2$ in phase relative to the transfer characteristic of bandpass filter 1. A second digital-to-analog converter 42 in the form of an integrating network, which just like integrating network 7 corresponds to integrating network 25 in delta modulator 5, is connected to the output of second combination network 38. A suppression filter 43, which corresponds to suppression filter 29, is connected in cascade with this integrating network 42. Furthermore, the phase angle over which network 40 shifts the carrier from carrier generator 4 is also $\pi$ /2. The analog signal selected with the aid of the $\pi/2$ phase-shifted transfer characteristic is modulated in second modulator 39 on the $\pi/2$ phase-shifted carrier of 2.8 kHz whereafter the output signal from second modulator 39 is subtracted in combination network 41 from the output signal from modulator 3. Te demodulated data signal in the base band ranging from 0 to 2.4 kHz is directly derived from combination network 41 so that the distortion in the demodulated data signal caused by the asymmetrical distortion in the transfer characteristic of bandpass filter 1 (compare FIG. *2C* ) is exactly corrected, as will now be described in greater detail.

For obtaining the $\pi/2$ phase-shifted transfer characteristic the desired amplitude characteristic $A_B(\omega)$ according to formula (1) is approximated by a Fourier series employing N sine terms in which for the sake of a linear phase characteristic the transfer coefficients of weighting networks 31 – 37, referred to as $S_p$ for distinction, now satisfy $$\begin{cases} S_{-p} = -S_p \text{ with } p=1, 2, \ldots, N \\ S_0 = 0 \end{cases} \qquad (9)$$

A transfer characteristic $\overline{H}(\omega) = \overline{A}(\omega) \exp J\overline{\phi}(\omega)$ is obtained by this Fourier approximation employing N sine terms and its amplitude characteristic $\overline{A}(\omega)$ has the shape:

$$\overline{A}(\omega) = \sum_{p=1}^{N} 2Sp \sin (p\omega\tau) \qquad (10)$$

and the phase characteristic $\overline{\phi}(\omega)$ varies also linearly in accordance with:

$$\overline{\phi}(\omega) = -\text{N}\ \omega\tau + \pi/2$$

in which $\overline{\phi}(\omega)$ according to formula (11) relative to $\phi(\omega)$ according to formula (6) is shifted $\pi/2$ in phase. The coefficients $S_p$ in the Fourier series may be determined with the aid of the relation analoguous to formula (8):

$$S_p = (1/\Omega) \int_0^{\Omega} \tilde{A}_B(\omega) \cdot \sin (p\omega\tau) d \qquad (12)$$

For a phase shift of $\pi/2$ between the transfer characteristics composed of cosine terms and sine terms Applicants found the surprising phenomenon that by a Fourier approximation of the desired amplitude characteristic $\overline{A}_B(\omega)$ employing a limited number of terms N the asymmetrical distortion in the two amplitude characteristics $A_B(\omega)$ and $\overline{A}_B(\omega)$ are exactly equal in magnitude but are of opposite sign. This may also be apparent from a comparison between the amplitude characteristic $A_B(\omega)$ in FIG. *2C* and the amplitude characteristic $\overline{A}_B(\omega)$ in FIG. *2d* which represents the Fourier approximation of the desired amplitude characteristic $\tilde{A}_B(\omega)$ employing 20 sine terms, hence as in FIG. *2C* for a number of 2N=40 shift register elements.

After modulation of the analog signals thus selected in bandpass filter 1 and in correction circuit 30 on carriers having a mutual phase shift of $\pi/2$ and after combination of the output signals from modulators 3, 39 in combination network 41 the distortions n the frequency-transposed analog signal caused by asymmetrical distortion are found to be exactly corrected. This means that correction circuit 30 causes the frequency transposition arrangement to select the desired frequency band, as it were, with an amplitude characteristic of the shape shown in FIG. *2e* which is exactly symmetrical relative to the center frequency $\omega_m$.

By using the steps according to the invention a frequency transposition of high quality and favourable minimum stopband attenuation is obtained during selection in the arrangement in spite of a decrease in the number of shift register elements by factors in the order of 3 to 5. It has been found from experiments with the described receiver for carrier-modulated data signals that in spite of a reduction of the number of shift register elements from 200 to 40 the eye opening in the eye pattern of the demodulated data signals is not noticeably influenced, i.e. the different amplitude values in the data signals can be eminently distinguished. On the one hand a frequency transposition of high quality is thus ensured and on the other hand the conditions for practical integration in a semiconductor body are amply satisfied by the considerable decrease in the number of shift register elements both as regards the admissible direct supply current and as regards the requirements of accuracy of the weighting netowkrs. As a result Applicants are able to completely integrate such a frequency transposition arrangement in one semiconductor body.

To explain the previously mentioned new phenomena which occur in the frequency transposition arrangement as a result of the approximation of the transfer characteristic of bandpass filter 1 by a Fourier series having a limited number of terms, a mathematical elaboration will now be given which will be further described with reference to a few frequency diagrams in FIG. 3.

The starting point for this elaboration of the asymmetrical distortion in the transfer characteristic of bandpass filter 1 is the Fourier development $A_B(\omega)$ of the amplitude characteristic $\tilde{A}_B(\omega)$ shown in FIG. 2*a*. The development is truncated after a limited number of cosine terms. In accordance with formula (5) we can write for $A_B(\omega)$:

$$A_B(\omega) = C_0 + \sum_{p=1}^{N} 2C_p \cos(p\omega\tau) \qquad (13)$$

If in formula (13) the following substitution for coefficients $C_p$ is introduced:

$$C_p = 2\cos(p\omega_m\tau).\ C_{pL} \qquad 14$$

in which $\omega_m$ is again the center frequency of bandpass filter 1, it is found that the Fourier series (13) may be written as the sum of two Fourier series composed of cosine terms and having variables $(\omega-\omega_m)$ and $(\omega+\omega_m)$ instead of $\omega$ while the coefficients in both series are mutually equal and are given by $C_{pL}$. Particularly there applies that:

$$A_B(\omega) = C_{0L} + \sum_{p=1}^{N} 2C_{pL}\cos[p(\omega-\omega_m)\tau] + C_{0L} + \sum_{p=1}^{N} 2C_{pL}\cos[p(\omega+\omega_m)\tau] \qquad (15)$$

which with the introduction of the simplified relation:

$$A_L(\omega) = C_{0L} + \sum_{p=1}^{N} 2C_{pL}\cos(p\omega\tau) \qquad (16)$$

can be written as:

$$A_B(\omega) = A_L(\omega-\omega_m) + A_L(\omega+\omega_m) \qquad 17$$

Figure 3:
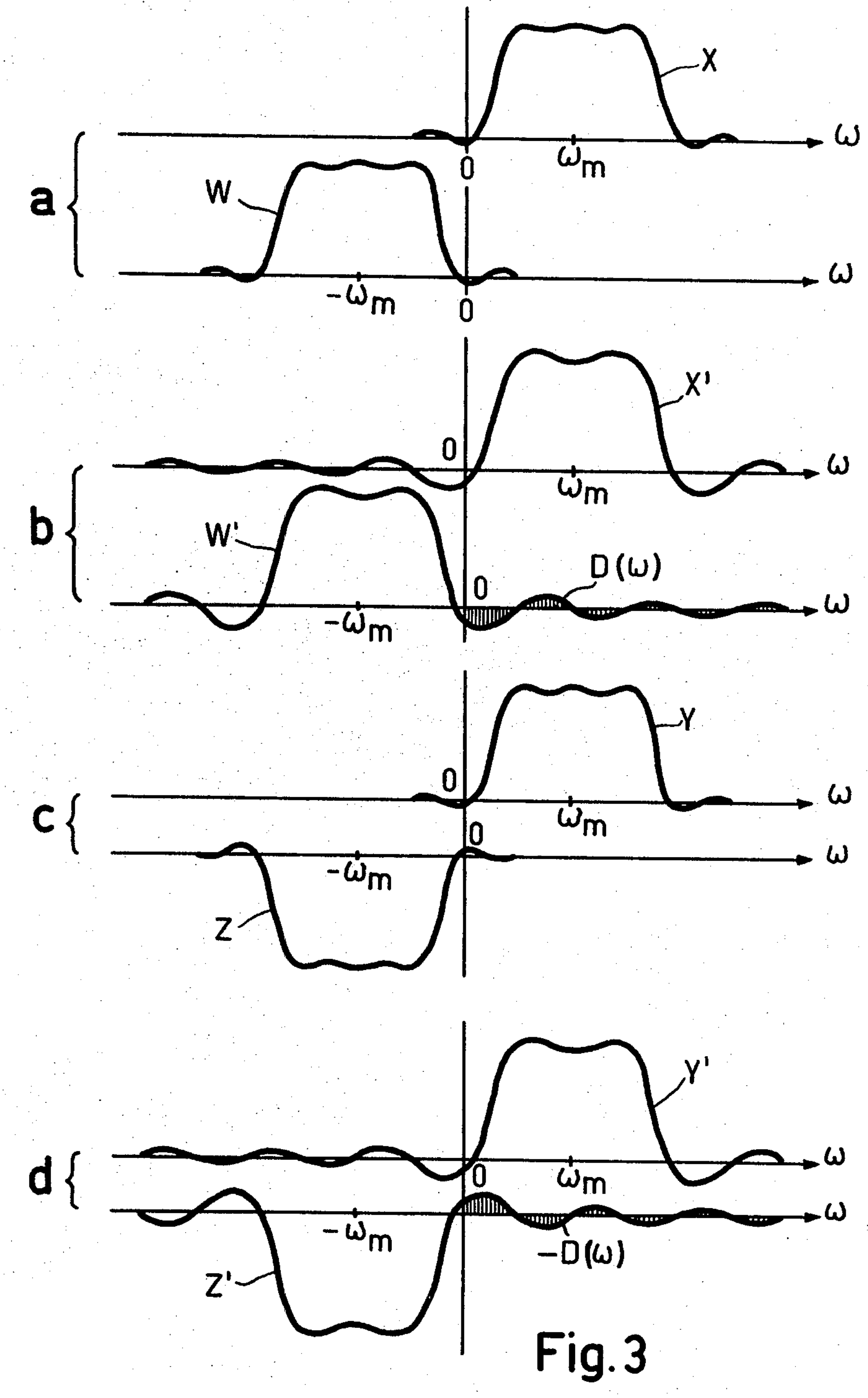

FIG. 3*a* shows for a large number of Fourier terms, namely for N = 100, the first passbands of the two Fourier series $A_L(\omega-\omega_m)$ and $A_L(\omega+\omega_m)$, in which FIG. 3, as in the foregoing, the periodical behaviour of the Fourier series has been left out of consideration. The first Fourier series $A_L(\omega-\omega_m)$ results in the desired amplitude characteristic $x$ of bandpass filter 1 and the second Fourier series $A_L(\omega+\omega_m)$ results in the amplitude characteristic $w$ which apparently does not have any physical significance because it is located in the range of the negative frequencies. This amplitude characteristic $w$ in the negative frequency range does not given any practical contribution in the passband of the desired amplitude characteristic $x$ in the positive frequency range.

The situation for a limited number of Fourier terms, for example, for N = 20 as is shown in FIG. 3*b* is completely different. In this case the Fourier series $A_L(\omega-\omega_m)$ and $A_L(\omega+\omega_m)$ result in the amplitude characteristics $x'$ and $w'$. The amplitude characteristic $w'$ which is associated with $A_L(\omega+\omega_m)$ extends beyond the passband of the desired amplitude characteristic $x'$ in the positive frequency range abd thus provides a contribution $D(\omega)$ in this passband. It is this contribution $D(\omega)$ which causes the asymmetrical distortion in the amplitude characteristic $A_B(\omega)$ of bandpass filter 1 in FIG. 2C; this amplitude characteristic may thus be represented by:

$$A_L(\omega-\omega_m) + D(\omega) \qquad 18$$

The magnitude of this asymetrical distortion $D(\omega)$, which occurs in case of a limited number of shift register elements, depends on the form of the desired amplitude characteristic of bandpass filter 1. Thus, $D(\omega)$ increase with the relative bandwidth $(2\omega_b/\omega_m)$ and with the slope of the flanks $(k = \omega_b/\Delta\omega)$ i.e. $D(\omega)$ assumes large values just in those circumstances where the problem of integration of the frequency transposition arrangement occurs and where the above phenomenon of the asymmetrical distortion $D(\omega)$ has been found for the first time. Since this asymmetrical distortion $D(\omega)$ which is characteristic of the described arrangement, can always be exactly eliminated as appears from the frequency diagrams of FIGS. 2*a* -2*d*, the minimum attentuation in the stop-band range of bandpass filter 1 constitutes a limit for the reduction of the number of shift register elements because the minimum stop-band attenuation decreases when the number of shift register elements decreases. The steps according to the invention are particularly advantageous in case of minimum attenuations of 15 to 30 dB in the stop-band range corresponding to 35 to 70 shift register elements in the described embodiment.

As already described hereinbefore this asymmetrical distortion $D(\omega)$ is exactly eliminated according to the invention while using a correction term which is derived in correction circuit 30 from a phase shifted version of the transfer characeristic of bandpass filter 1. Particularly in the arrangement according to FIG. 1 the starting point is the $\pi/2$ phase-shifted version which realized according to formula (10) by the Fourier development $\bar{A}_B(\omega)$ of the amplitude characteristic $\tilde{A}_B(\omega)$ shown in FIG. 2*a* which development employs a limited number of sine terms; it follows that $\bar{A}_B(\omega)$ can be written:

$$\bar{A}_B(\omega) = \sum_{p=1}^{N} 2Sp\sin(p\omega\tau) \qquad (19)$$

If the following substitution is performed in formula (19) for the coefficients $S_p$:

$$S_p = 2\sin(p\omega_m\tau).\ S_{pL} \qquad 20$$

it appears that the Fourier series (19) can be written as the difference between two Fourier series with the special feature that these two Fourier series, like the two Fourier series for the transfer characteristic $A_B(\omega)$ of bandpass filter 1 according to formula (15), are composed of cosine terms employing $(\omega-\omega_m)$ and $(\omega+\omega_m)$ as variables and that the coefficients in the two series are given by $S_{pL}$. Particularly there applies that:

$$\bar{A}_B(\omega) = S_{0L} + \sum_{p=1}^{N} 2S_{pL}\cos[p(\omega-\omega_m)\tau] + -S_{0L} - \sum_{p=1}^{N} 2S_{pL}\cos[p(\omega+\omega_m)\tau] \qquad (21)$$

As a second special feature, it appears that also the coefficients $C_{pL}$ and $S_{pL}$ in the Fourier series (15) and (21) are mutually equal. This may be proved purely mathematically, but it may alternatively be evident from the frequency diagrams of FIGS. 3*a* —3*d* . *The first passbands of the two Fourier series in formula* (21) are shown at *c* in FIG. 3 for a large number of Fourier terms and more specifically for N = 100, as in FIG. 3*a* while the amplitude characteristics *y* and *z* are associated with the first and second Fourier series respectively, in formula (21). Since the amplitude characteristics *x* and *y* respectively, in FIGS. 3*a* and 3*c* are mutually equal because both of them represent the amplitude characteristic of bandpass filter 1, and since the two first Fourier series in formulas (15) and (21) are developed in the same terms cos $[p(\omega-\omega_m)\tau]$, the coefficients $S_{pL}$ and $C_{pL}$ in these Fourier series are mutually equal so that:

$$S_{pL} = C_{pL} \qquad (22)$$

and $\overline{A}_B(\omega)$ according to the formula (21) can be $$\overline{A}_B(\omega) = C_{0L} + \sum_{p=1}^{N} 2C_{pL} \cos[p(\omega-\omega_m)\tau] + -C_{0L} - \sum_{p=1}^{N} 2C_{pL} \cos[p(\omega+\omega_m)\tau] \qquad (23)$$

When the amplitude characteristic $A_B(\omega)$ of bandpass filter 1 according to formula (15) is compared with the amplitude characteristic $\overline{A}_B(\omega)$ of the $\pi/2$phase-shifted version obtained from correction circuit 30 according to formula (21), it can be seen that the composite Fourier series in the two formulae (15) and (21) are equal but occur with the same sign in formula (15) and with the opposite sign in formula (21).

Thus, with the aid of the simplified relation given in formula (16) the amplitude characteristic $\overline{A}_B(\omega)$ according to formula (23) can be written as:

$$\overline{A}_B(\omega) = A_L(\omega = \omega_n) - A_L(\omega+\omega_m) \qquad (24)$$

FIG. 3*d* shows for a limited number of Fourier terms, and more specifically for N = 20 just as in FIG. 3*b*, the amplitude characteristics *y'* and *z'* which are associated with the Fourier series $A_L(\omega-\omega_m)$ and $-A_L(\omega+\omega_m)$, respectively. As in FIG. 3*b* the amplitude characteristic *z'* in the negative frequency range extend beyond the passband of the desired amplitude characteristic *y'* in the positive frequency range and thus provides a contribution in this passband. This contribution is equal, in magnitude, but opposite in sign to the contribution $D(\omega)$ provided by the amplitude characteristic *w'* in FIG. 3*b* because in formulae (17) and (24) for the amplitude characteristics of bandpass filter 1 and for the $\pi/2$phase-shifted version obtained in correction circuit 30 the composite Fourier series are mutually equal but occur with the same sign in formula (17) and with the opposite sign in formula (24).

Accordingly an asymmetrical distortion $-D(\omega)$ occurs in the amplitude characteristics $\overline{A}_B(\omega)$ in FIG. 2d; this amplitude characteristic may then be represented by:

$$A_L(\omega-\omega_m) - D(\omega) \qquad (25)$$

Thus, by starting from the $\pi/2$ phase-shifted version of the transfer characteristic of bandpass filter 1 for the purpose of correcting the asymmetrical distortion $D(\omega)$, a correction term $-D(\omega)$ is obtained which term, apart from a phase shift $\pi/2$, is equal in magnitude but opposite in sign to the asymmetrical distortion $D(\omega)$ to be corrected. The correction term $-D(\omega)$ after modulation on a $\pi/2$phase-shifted carrier in modulator 40 exactly corrects the effect of the asymmetrical distortion $D(\omega)$ on the analog output signal from the frequency transposition arrangement in combination network 41. The ultimate selection in the frequency transposition arrangement therefore takes place with a transfer characteristic in which the asymmetrical distortion which is seriously affecting the transmission quality, is completely eliminated as may be apparent from the amplitude characteristic shown in FIG. 2*e*.

The nature of the phenomenon of asymmetrical distortion as a result of a limited number of terms in the Fourier development of the desired transfer characteristic is explained in the elaboration hereinbefore. We have also explained the effect obtained by using the steps according to the invention, notably the remarkable effect of the exact elimination of the influence of this very disturbing asymmetrical distortion so that the described frequency transposition arrangement is amply within the scope of possibilities for practical integration in one semiconductor body. In fact, due to the exact elimination of the asymmetrical distortion a frequency transposition of high quality is realized in spite of a considerable reduction of the number of shift register elements, for example, from 200 to 40.

As regards its construction the arrangement described in which the analog-to-digital converter 5 is constituted by a delta modulator not only has the advantage of a remarkable simplicity in structure but also of a great flexibility of use. In the frequency transposition arrangment an adaptation to different levels of the incoming analog signal can be obtained in a simple manner by varying the magnitude of the pulses which are applied to integrating network 25 in delta modulator in accordance with the level of the incoming analog siganl. To this end the pulses derived from pulse regenerator 24 may be applied through an amplitude modulator 44 to integrating network 25, amplitude modulator 44 being connected to a level control voltage generator 45 controlled by the incoming signal. This level control voltage generator 45 is constituted, for example, by a pilot receiver for the selection of a pilot signal co-transmitted with the transmitted analog signal. The pilot receiver includes a cascade of a selection filter, a rectifier with the associated smoothing filter and an amplifier from which the level control signal is derived. The described frequency transposition arrangement can be used without any difficulty for different methods of modulation, for example, not only for single sideband modulated signals but also for frequency-modulated, phase-modulated or vestigial sideband-modulated signals.

In addition to the embodiment shown in detail in FIG. 1 further embodiments are possible within the scope of the invention. The digital-to-analog converters 7, 42 constituted as integrating networks may be replaced by one integrating network which is included, for example, after combination network 41. Likewise the analog-to-digital converter 5 may be constituted as a delta-sigma modulator by incorporating network 25 between difference producer 26 and pulse code modulator 23 in which case the associated digital-to-alanog converters are constituted by lowpass filters which can be combined with the suppression filters 29, 43. A further possibility consists in that the transfer characteristics $I(\omega)$ of the integrating networks 7, 42 are also obtained with the aid of the weighting networks 15 – 21; 22 and 31 – 37; 38, respectively, namely by determining their transfer coefficients for the transfer characteristics $A_B(\omega) . I(\omega)$ and $\bar{A}_B(\omega) . I(\omega)$ so that the integrating networks 7, 42 as separate elements may be omitted.

Figure 4:
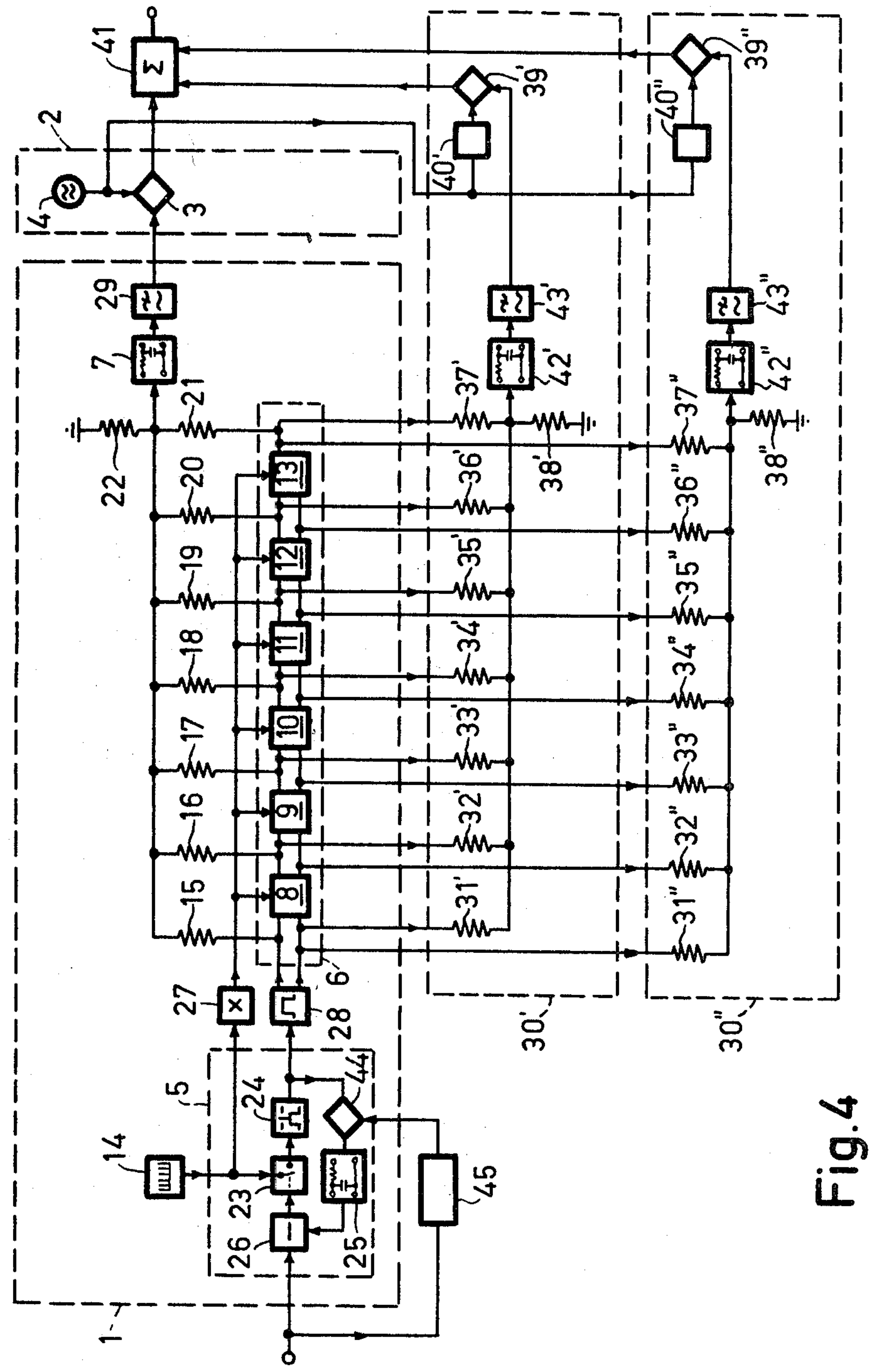
FIG. 4 shows a modification of the arrangement of FIG. 1.

FIG. 4 shows a further modifiction of the frequency transposition arrangement of FIG. 1 in which, however, instead of a single correction circuit 30 two correction circuits 30′ and 30″ are used which are connected in a parallel arrangement to the shift register elements 8 – 13 in the same manner as correction circuit 30 of FIG. 1. Elements in FIG. 4 which correspond to elements in FIg. 1 have the same reference numerals, but in correction circuit 30′ they are provided with indices and in correction circuit 30″ they are provided with double indices.

In the same manner as in the arrangement of FIG. 1 the effect of the asymmetrical distortion $D(\omega)$ on the frequency-transposed analog output signal is exactly eliminated in the arrangement of FIG. 4 by using correction terms which are derived in the correction circuits 30′ and 30″ from different phas-shifted versions of the transfer characteristic of bandpass filter 1. Particularly $\pi/3$ and $2\pi/3$ phase-shifted versions of the transfer characteristic of bandpass filter 1 are obtained with the aid of the weighting networks 31′– 37′; 38′ and 31″– 37″; 38″, respectively, by proportioning the respective transfer coefficients for a linear superposition of the two developments $A_B(\omega)$ and $\bar{A}_B(\omega)$ according to formulae (5) and (10), while carriers which are likewise shifted $\pi/3$ and $2\pi/3$ in phase are obtained with the aid of phase-shifting networks 40′ and 40″, respectively.

In conformity with the description with reference to the arrangment of FIG. 1 it can be proved for the arrangement of FIG. 4 that starting from the $\pi/3$ and $2\pi/3$ phase-shifted versions of the transfer characteristic of bandpass filter 1 also correction terms $D'(\omega)$ and $D''(\omega)$ are obtained, which apart from a phase shift of $-2\pi/3$ and $-4\pi/3$, respectively, have the same magnitudes as the asymmetrical distortion $D(\omega)$ to be corrected. Both correction terms $D'(\omega)$ and $D''(\omega)$ produce after modulation on the $\pi/3$ and $2\pi/3$ phase-shifted carriers in modulators 39′ and 39″ and after combination in combination network 41 together exactly a correction term $-D(\omega)$ which, as in the arrangement of FIG. 1, exactly corrects the effect of the asymmetrical distortion $D(\omega)$. In this arrangement modulators 3, 39′ and 39″ may be formed as switching modulators.

The number of correction circuits for the correction of the asymmetrical distortion may be extended simply to an arbitrary number $m$. Generally directly consecutive phaseshifted versions of the transfer characteristic must show a phase difference $\phi = q\,\pi/(m+1)$ with $q \neq (m+1)$ and $q = 1, 2, 3, \ldots$ when $\phi$ is located in the interval $0 < \phi < 2\pi$ while for the phase difference of the associated directly consecutive carriers also the value $\phi$ or the value $-\phi$ must be taken dependent on whether the lower sideband or the upper sideband is selected. In addition to the possibility of using switching modulators this provides the advantage that small deviations of the desired phase differences $\phi$ between consecutive correction circuits become less and less important when the number of correction circuits increases.

The arrangements described may advantageously be utilized for frequency transposition of a number of analog signals located in different partial bands of a frequency time division multiplex, while in the manner as already described with reference to FIGS. 1 and 4 the different partial bands are selected with a bandpass filter and each selected partial band is transposed to the desired frequency range. In this embodiment of the arrangement according to the invention a considerable economy of equipment may be realized, namely instead of a separate analog-to-digital converter and a separate shift register for each of the different partial bands, an analog-to-digital converter which is common to all frequency partial bands and a common shift register can be used so that complete integration in a semiconductor body is also made possible in this case.

Thus it is found that the use of the steps according to the invention not only leads to a complete integration of a frequency transposition arrangment for one frequency channel, but also to a complete integration of a frequency transposition arrangement for different frequency channels so that even receivers of the frequency time division multiplex can be integrated in one semiconductor body.

What is claimed is:

1. An arrangement for frequency transposition of analog input signals in a given frequency band, comprising analog-to-digital converter means for providing a digital signal corresponding to the analog input signals, shift register means comprising a plurality of serially connected shift register elements for transferring the contents of a preceding shift register element to a succeeding shift register element in response to shift pulses, means connecting the output of the analog-to-digital converter to a first of the shift register elements, shift pulse source means for providing shift pulses having a period shorter than one-half the period of the highest frequency in the given frequency band of the analog signals to the shaft register means, first weighting network means connected to each of the shift register elements for multiplying the contents of each shift register element by a factor corresponding to terms of the Fourier expansion of a desired bandpass filter transfer characteristic, a first combining network connected to the first weighting network means for summing the weighted output of the shift register elements every shift period of the shift register pulses, a second weighting network means connected to each of the shift register elements for multiplying the contents of each shift register element by a factor corresponding to terms of the Fourier expansion of the desired transfer characteristic shifted over a fixed phase angle, a second combining network connected to the second weighting network means for summing the output of the shift register elements weighted by the second weighting network means every shift period of the shift pulses, a first digital-to-analog converter connected to the first combining means for providing a first analog output signal filtered by the transfer characteristic of the first weighting network and the first combining means, a second digital-to-analog converter connected to the second combining means for providing a second analog output signal filtered by the transfer characteristic of the second weighting network and the second combining means, a carrier frequency generator, a first modulator means connected to the carrier frequency generator and to the first digital-to-analog converter for modulating the output of the carrier frequency generator with the first analog output signal, a phase shifter, a second modulator means connected to the carrier frequency generator through the phase shifter and connected to the second digital-to-analog converter for modulating the phase shifted output of the carrier frequency generator with the second analog output signal, and a combination network connected to the output of the first modulator means and the second modulator means for combining the modulated carrier from the first modulator with the phase shifted modulated carrier from the second modulator.

2. An arrangement as claimed in claim 1, wherein the plurality of shift register elements is reduced to values at which the minimum attenuation in the stop-band range of the transfer characteristic of the bandpass filter is located in the range between 15 dB and 30 dB.

3. An arrangement as claimed in claim 1, wherein the second weighting network, the second combining network, the phase shifter and the second modulator comprise a correction circuit, wherein the arrangement comprises $m-1$ additional correction circuits, the phase difference between the phase angles of each additional correction circuit being equal to $q\pi/(m+1)$, where $q \neq (m+1)$ and $q$ is an integer and where the phase difference is between 0 and $2\pi$, the phase difference between carrier frequency phase shifters of each additional correction circuit being equal to $q\pi/(m+1)$.

4. An arrangement as claimed in claim 2, wherein the second weighting network, the second combining network, the phase shifter and the second modulator comprise a correction circuit, wherein the arrangement comprises $m-1$ additional correction circuits, the phase difference between the phase angles of each additional correction circuit being equal to $q\pi/(m+1)$, where $q \neq (m+1)$ and q is an integer and where the phase difference is between 0 and $2\pi$, the phase difference between carrier frequency phase shifters of each additional correction circuit being equal to $q\pi/(m+1)$.

5. An arrangement as claimed in claim 1, adapted for frequency transposition of a plurality of analog signals located in different partial bands of a frequency division multiplex, wherein the analog-to-digital converter and the shift register means connected thereto is common to all partial bands.

6. An arrangement as claimed in claim 1, wherein the analog-to-digital converter comprises a delta modulator, the delta modulator comprising a pulse code modulator, a level control signal generator means connected to the analog input signals for producing level control signals corresponding to amplitude ranges of the analog input signals, an amplitude modulator connected to the pulse code modulator and to the level control signal generator means for modulating the output of the pulse code modulator with the level control signals, an integrating network connected to the output of the amplifier modulator, and a difference producing network for subtracting the output of the integrating network from the analog input signals and for providing the result of the subtraction to the pulse code modulator.

* * * * *